United States Patent [19]

Pretty

[11] Patent Number: 5,409,533
[45] Date of Patent: Apr. 25, 1995

[54] APPARATUS FOR PROVIDING BUTTERED TOAST

[76] Inventor: Laurence H. Pretty, 444 S. Flower St., Ste. 2000, Los Angeles, Calif. 90017

[21] Appl. No.: 93,014

[22] Filed: Jul. 19, 1993

[51] Int. Cl.⁶ .......................... B05C 5/00; B05C 11/00
[52] U.S. Cl. ........................................ 118/13; 118/21; 118/25; 118/63; 118/300
[58] Field of Search ...................... 118/13, 20, 21, 23, 118/24, 25, 63, 300, 301, 324

[56] References Cited

U.S. PATENT DOCUMENTS

| | | | |
|---|---|---|---|
| 1,070,217 | 8/1913 | Willians et al. | 118/24 |
| 1,504,008 | 8/1924 | Wicksteed | 118/13 |
| 1,520,286 | 12/1924 | Fabian | 118/24 |
| 1,579,740 | 4/1926 | Thorling | 118/24 |
| 1,666,335 | 4/1928 | Lentz | 118/24 X |
| 1,911,965 | 5/1933 | Perez | 118/13 |
| 2,851,003 | 9/1958 | Binsted et al. | 118/13 |
| 3,407,782 | 10/1968 | Medley | 118/13 |
| 3,589,274 | 6/1971 | Murray | 118/13 X |
| 3,670,642 | 6/1972 | Bergman | 118/25 X |
| 3,710,754 | 1/1973 | Pond | 118/13 |
| 4,576,108 | 3/1986 | Socola et al. | 118/24 X |

Primary Examiner—James C. Housel
Assistant Examiner—Long V. Le
Attorney, Agent, or Firm—Laurence H. Pretty

[57] ABSTRACT

An apparatus which is intended to apply butter from a mass thereof in solid condition to a slice of bread. A housing contains a transfer member connected with the housing by connecting structure which supports the transfer member for sliding motion. A plurality of openings extends through the transfer member. The transfer member and the mass of butter are moved into contact to cause a portion of the butter to enter the openings. The transfer member and the mass of butter are separated to sever the butter within the openings from the mass of butter to leave the openings at least partially filled with butter. The slice of bread is supported with a surface thereof to be buttered spaced adjacent and facing toward the openings in the transfer member. Gas under pressure is directed through the openings to propel the butter within the openings outwardly therefrom into contact with the surface of the slice of bread.

9 Claims, 2 Drawing Sheets

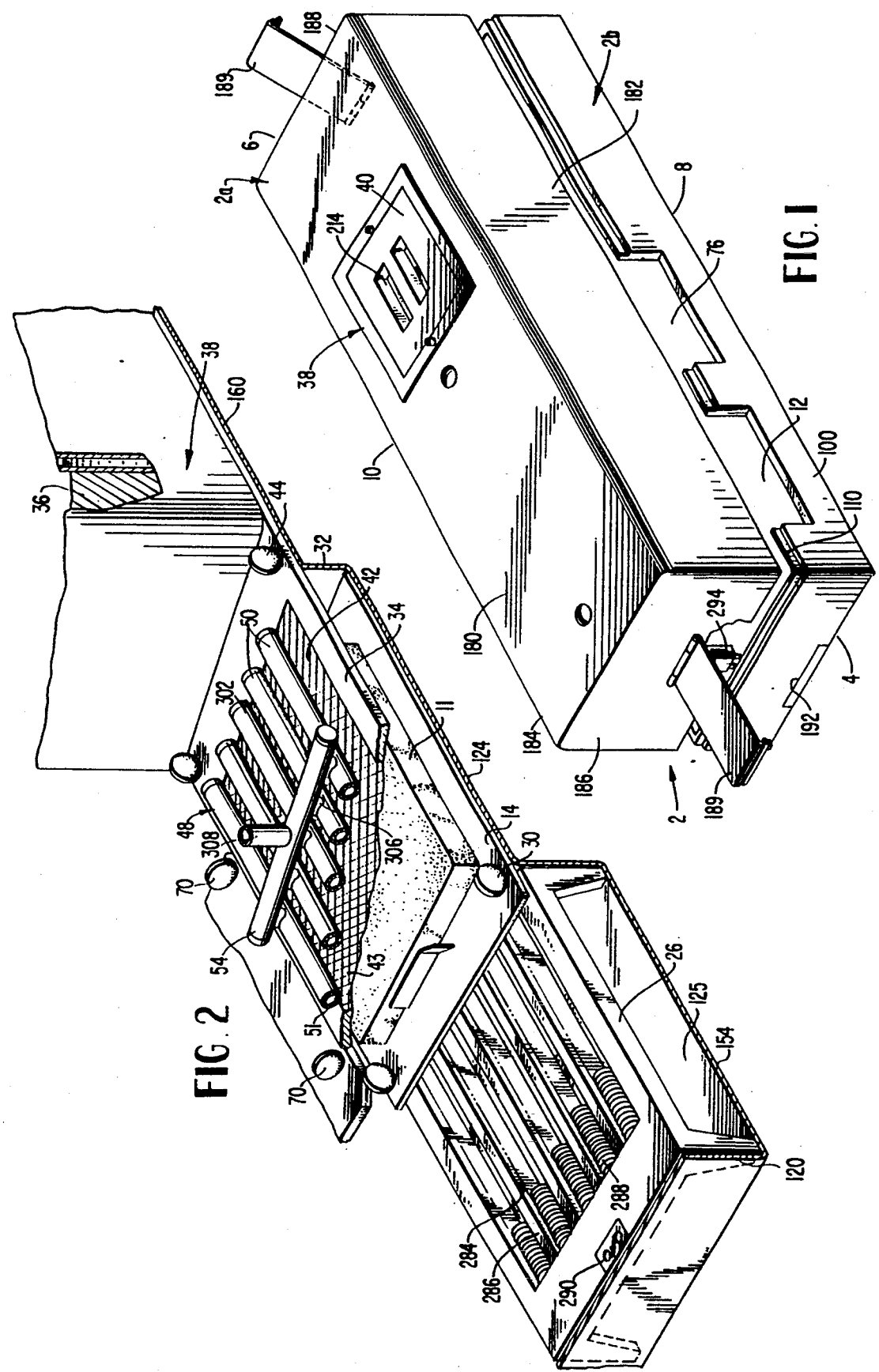

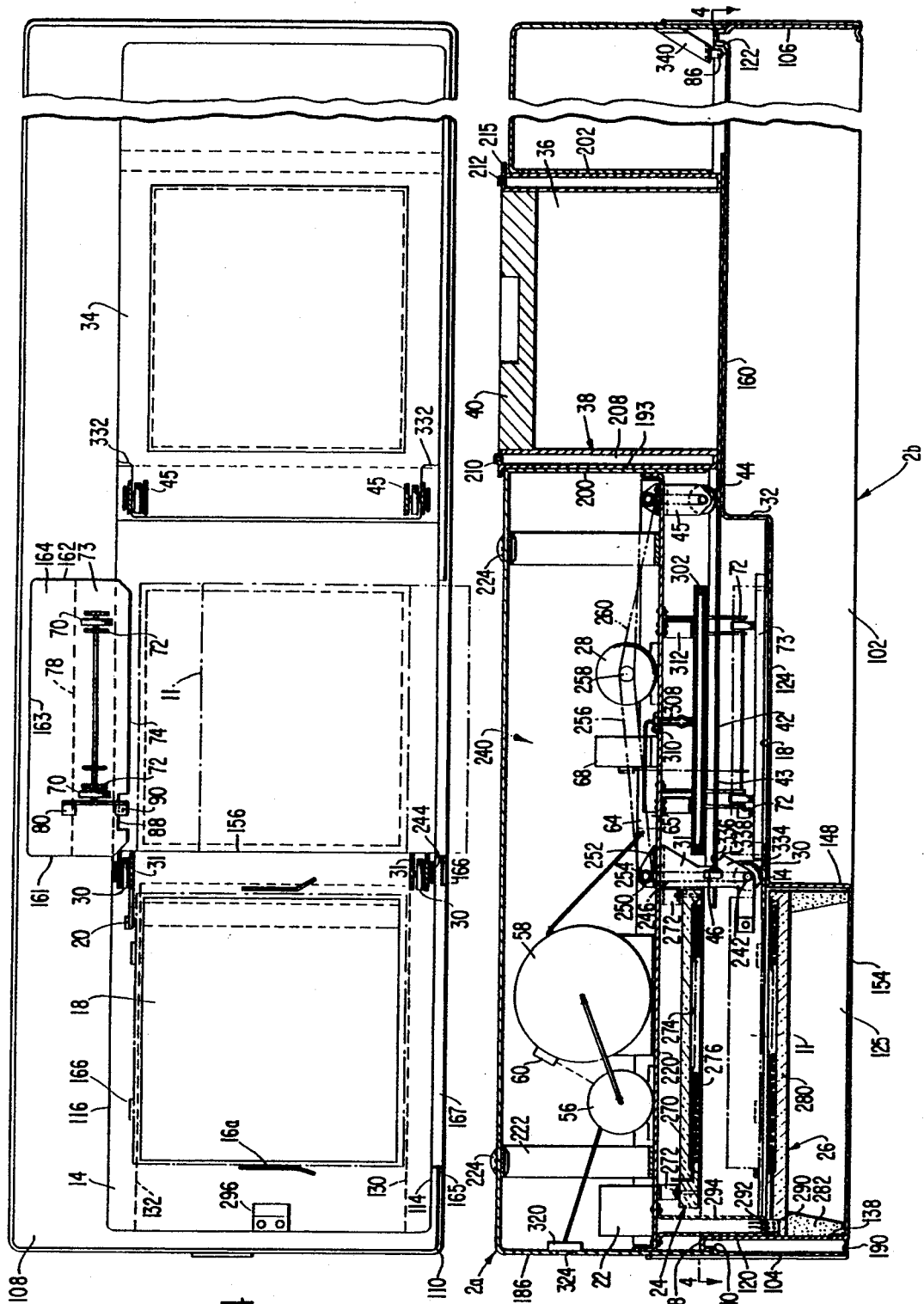

APPARATUS FOR PROVIDING BUTTERED TOAST

BACKGROUND OF INVENTION

This invention relates to a method and apparatus for providing buttered toast.

In preparing a slice of buttered toast according to current commercial practice, it is common to utilize an electric toaster to toast the slice of bread with the butter thereafter being spread on the slice by hand. In high volume commercial catering operations such as, for example, those conducted in restaurants adjacent main highways or at travel terminals, significant amounts of waitresses' time are wasted in performing the manual buttering operation and this problem is particularly acute at busy periods.

In an attempt to obviate this problem, certain prior machines have been devised for conducting toasting and buttering operations on the slice of bread automatically without a manual butter spreading step. Such prior devices have, however, significantly failed to come into general use because their construction was, in almost all instances, attended by two major disadvantages.

The first of these disadvantages is that the prior devices have generally required the butter to be spread, to be maintained in a melted condition to permit it to be sprayed or brushed onto the bread. However, as is well known, butter rapidly tends to go rancid when maintained at the elevated temperature necessary to maintain it in melted condition. As a result, it might frequently be necessary to change the butter while significant amounts still remained unused in order to avoid problems of rancid butter. This could involve a considerable and costly wastage of butter as well as requiring frequent inoperative periods of the machine while the butter was changed.

The other major disadvantage associated with the prior buttering machines has been a hygiene problem. In equipment of this type, it is necessary at the conclusion of a day's operations for the parts of the machine coming into contact with foodstuff to be thoroughly cleaned to remove butter smears, toast crumbs, and the like, which might provide a breeding ground for germs if left untouched. However, the prior machines have generally been of such complex construction that access to the parts to be cleaned could not readily be obtained by the relatively mechanically unskilled personnel customarily employed in commercial catering establishments.

OBJECTS AND SUMMARY OF INVENTION

It is, therefore, a general object of the invention to provide a method and apparatus for the production of buttered toast, which obviates or minimizes problems of the type generally discussed.

It is a particular object of the invention to provide a method and apparatus for applying butter from a mass thereof in solid condition to a slice of bread, wherein the mass of butter is enabled to remain in a solid condition at a sufficiently low temperature for there to be no problem of the butter becoming rancid.

It is another important object of the invention to provide an apparatus for applying butter to bread in which access may very easily be gained to the parts of the machine coming into contact with foodstuffs so that the machine may readily be cleaned by mechanically unskilled personnel to maintain a high standard of hygiene.

A method aspect of the invention intended to accomplish at least some of the foregoing objects is intended for applying butter from a mass thereof in solid condition to a slice of bread. The method includes the steps of providing a foraminous transfer member having a plurality of openings extending through the member. The transfer member and the mass of butter are moved relatively together to cause the butter to enter the openings in the transfer member. Thereafter, the transfer member and the mass of butter are relatively separated to sever the butter within the openings from the mass of butter to cause the openings to remain at least partially filled with butter subsequent to separation. The transfer member and the slice of bread are positioned in such relative disposition that the openings in the transfer member are adjacent and facing toward a surface to be buttered of the slice of bread. Thereafter, gas under pressure is directed through the openings in the transfer member toward the slice of bread to propel the butter within the openings outwardly therefrom into contact with the surface to be buttered.

It will be readily appreciated that by utilizing a foraminous transfer member which is first clogged with butter and then has air blown through it to separate the butter and position it on the toast, the mass of butter may be maintained continuously in a solid condition without requiring to be melted. Thus, this offers the major advantage that the butter will not become rancid within relatively short intervals of time thus obviating problems of butter wastage and the necessity for frequent, time consuming, changes of butter.

An apparatus aspect of the invention includes a housing containing a transfer member with connecting means connecting the transfer member with the housing. A plurality of openings extend through the transfer member. First means connected with the housing is adapted to move the mass of butter into contact with the transfer member to cause a portion of the butter to enter the openings. Second means connected with the housing is adapted to cause relative separation between the mass of butter and the transfer member to sever the butter within the openings from the mass of butter to leave the openings at least partially filled with butter, after separation. Support means connected with the housing is adapted to support the slice of bread with the openings in the transfer member adapted to be adjacent and facing toward the surface of the slice of bread. Fluid pressure means connected with the housing directs gas under pressure through the openings in the transfer member to propel the butter within the openings outwardly therefrom into contact with the slice of bread.

THE DRAWINGS

An apparatus for applying butter from a mass thereof in solid condition to a surface of a slice of bread, according to a preferred embodiment of the invention is illustrated in the accompanying drawings in which;

FIG. 1 is a perspective view of an apparatus constructed in accordance with one preferred embodiment of the invention, with upper and lower housings forming a part of apparatus shown in a relatively separated condition;

FIG. 2 is a perspective view, partially in section and partially broken away, of a bread support member and butter transfer member forming parts of the apparatus shown in FIG. 1 with the members shown during application of butter to a slice of bread;

FIG. 3 is a cross-sectional side view of the apparatus shown in FIG. 1 but with the upper and lower housings shown in a connected condition and with the bread support member and butter transfer member shown in the position they occupy during application of butter to the slice of bread; and FIG. 4 is a cross-sectional top view of the apparatus shown in FIG. 3 taken along the lines 4—4 therein with the bread support member and butter support member shown in an initial position prior to the application position shown in FIGS. 2 and 3.

DETAILED DESCRIPTION

General Summary and Operation

Referring to FIG. 1 of the drawings, an apparatus for providing buttered toast according to a preferred embodiment of the invention is there shown.

The apparatus includes a longitudinally extending housing 2 having forward and rear ends 4 and 6, respectively, and left and right sides 8 and 10 respectively. The housing 2 is separable into two portions, an upper housing 2a and a lower housing 2b. A slice of bread 11 to be toasted and buttered is inserted transversely into the apparatus through a toast inlet opening 12 provided on the left side of the lower housing 2b adjacent the forward end thereof.

As the slice of bread 11 enters through the toast inlet opening 12, it moves onto the upper surface of a bread carrier 14 in a first position of the carrier (FIG. 4). The bread carrier 14 is a generally rectangular, horizontally disposed, metal plate supported for horizontal longitudinal motion along the lower housing 2b by supporting and guiding surfaces formed in the lower housing. As the slice of bread 11 moves onto the bread carrier 14, it contacts guide members 16 on the carrier which locate the slice of bread centrally above a rectangular opening 18 extending vertically through the carrier. The opening 18 is rectangular and has dimensions slightly smaller than the piece of bread 11 so that the lower surface thereof is exposed over almost all its area. As the slice of bread 11 moves to a transversely centralized position on the bread carrier 14 it contacts and activates a first microswitch 20.

Upon actuation of the first microswitch 20 a control unit 22 (FIG. 3) connected with an external electric power source (not shown) causes electric power to be delivered to upper and lower heating elements 24 and 26 supported on the upper and lower housings 2a and 2b respectively, spaced above and below the upper and lower surfaces of the slice of bread 11. The control unit 22 includes a time delay unit which permits the heating elements to operate for a predetermined first period sufficient to allow the bread to be adequately toasted.

At the conclusion of the predetermined first period the control unit 22 disconnects electric power from the heating elements 24 and 26 and connects electric power to a reversible first electric motor 28 to drive the motor in a forward direction thereof. The first motor 28 is connected through a drive train to a pair of carrier drive wheels 30 mounted for rotation about a horizontal transverse axis. The carrier drive wheels which are rubber tired, are supported by two brackets 31 connected to the upper housing 2a, in frictional driving contact with the upper surface of the bread carrier 14 adjacent the forward end thereof. Rotation of the first motor 28 in the forward direction thereof causes the wheels 30 to frictionally drive the bread carrier 14 rearwardly along the lower housing 2b, carrying the slice of bread 11 with it. The bread carrier 14 continues to move rearwardly until it is located in a second position (FIGS. 2 and 3) in which further rearward motion of the bread carrier is prevented by impingement of the rear transverse edge of the bread carrier against an upwardly and transversely extending intermediate internal wall 32 formed in the lower housing 2b.

Butter is to be applied to the upper surface of the toast once it has been moved to the second position and for this purpose a transfer member 34 (FIG. 3) is provided. The transfer member 34 comprises a horizontally disposed, rectangular, rigid plate which, in an initial position of the transfer member 34 (FIG. 4) is disposed adjacent the rear end of the housing 2b extending forwardly therefrom. The transfer member 34 is supported for longitudinal sliding motion along the lower housing 2b by supporting and guiding surfaces formed therein.

The transfer member 34 adjacent its forward end extends beneath a butter reservoir provided by a generally rectangular container 38 having an open lower end. Butter 36 in a solid condition is loaded within the container 38 and biased downwardly into contact against the upper surface of the transfer member 34 by a rectangular, solid stainless steel weight 40 slidably received within the container 38.

The transfer member 34 within the area thereof overlapped by the butter within the container 38, is provided with a rectangular, rigid foraminous grid 42 formed of expanded metal mesh. The foraminous grid 42 includes a very large number of openings 43 extending vertically entirely through the transfer member with the openings 43 being defined by surrounding, sharp-edged portions of expanded metal. The downward biasing force exerted by the steel weight 40 is sufficient to cause some of the butter within the butter reservoir to be forced downwardly into the openings 43 in the foraminous grid 42.

During the previous period of rotation of the first motor 28 in the forward direction thereof, another drive train causes the first motor 28 to concurrently rotate a pair of transfer drive wheels 44 mounted for rotation about a horizontal transverse axis in an opposite direction to the carrier drive wheels 30. The transfer drive wheels 44 are supported by two brackets 45 in frictional driving contact with the upper surface of the transfer member 34. The transfer drive wheels 44 are positioned adjacent a forward end of the transfer member 34, rearwardly of the butter container 38 and are spaced transversely on opposite sides of the transfer member out of contact with the path of the foraminous grid 42. Rotation of the transfer wheels 44 causes forward motion of the transfer member which continues until a forward end portion of the transfer member 34 contacts and activates a second microswitch 46 supported by one of the brackets 31 supporting the carrier drive wheel 30 and connected with the control unit 22. The control unit 22 thereupon terminates rotation of the first motor 28 leaving the transfer member in a second position thereof (FIG. 2) in which the foraminous grid 42 of the transfer member 34 is located above and generally coextensive with the upper surface of the slice of bread 11.

Actuation of the second microswitch 46 also causes the control unit 22 to initiate downward blowing of air under pressure through the openings 43 in the foraminous grid 42 of the transfer member, to blow the butter contained within the openings 43 downwardly therefrom onto the upper surface of the underlying piece of toast 11.

This application of air under high pressure involves the provision of an air distribution unit 48 spaced above and generally coextensive with the foraminous grid 42 of the transfer member 34 in the second or butter application position. The air distribution unit 48 includes five nozzle tubes 50 (FIG. 2) generally longitudinally coextensive with the foraminous grid 42, spaced at equal transverse intervals across and above the upper surface of the foraminous grid 42. The nozzle tubes 50 are provided along their length with plural downwardly facing nozzles 51 which direct air downwardly in a plurality of generally conical jets with adjacent jets overlapping so that a spray pattern encompassing substantially all of the upper surface of the foraminous grid 42 is provided.

Air under greater than atmospheric pressure is delivered to the nozzle tubes 50 through a transversely extending manifold 54 connected with the nozzle tubes 50. The air is provided by a continuously running, electrically powered air compressor 56 supplying air to an air storage container 58. Whenever the pressure in the air storage container 58 reaches a predetermined value in excess of atmospheric, a pressure controller 60 communicating with the air storage container 58 and connected with the air compressor 56 turns off the air compressor. The controller 60 turns the compressor 56 on again whenever the pressure in the storage container 58 falls to less than the predetermined value. An outlet conduit from the air storage container 58 is connected through a valve 64 to the manifold 54 of the air distribution unit 48.

Actuation of the second microswitch 46 in the manner previously described causes the control unit 22 which is connected with an actuator 65 for the valve 64, to open the valve so that the high pressure air may be delivered to the nozzles 51 to blow the butter from the foraminous grid 42 onto the toast 11, as described. The control unit 22, after a predetermined second time interval, then recloses the valve 64.

At the conclusion of the second predetermined time period, the control unit 22 causes electric power to be connected in one sense to a second reversible motor 68 (FIG. 3) drivingly connected with two ejector drive wheels 70. The ejector drive wheels 70 which are rubber-tired, are supported by two brackets 72 connected to the upper housing 2a for rotation about a horizontal, longitudinal axis with the lower peripheral extremities of the drive wheels contacting a horizontal, longitudinally and transversely extending, ejector plate 73. The ejector plate 73 is generally flat with its lower surface supported on a level with, or slightly above, the upper surface of the bread carrier 14 in the forward position thereof. In a retracted position, the ejector 73 includes a longitudinally and vertically extending left longitudinal edge 74 spaced to the right of the adjacent right longitudinal edge of the slice of bread 11.

Rotation of the motor 68 causes the ejector drive wheels 70 to frictionally drive the ejector plate transversely to the left across the bread carrier 14 so that the edge 74 moves the slice of bread 11 leftwardly out of the lower housing 2b through a toast outlet opening 76. After a predetermined amount of motion of the ejector plate 73, a sufficient portion of the bread to be readily grasped by hand, projects transversely outwardly of the lower housing 2b. At this time rear longitudinal edge 78 of the ejector plate 73 moves transversely to the left out of contact with a third microswitch 80 supported by one of the previously mentioned brackets 72 to thereby actuate the third microswitch.

Actuation of the third microswitch 80 which is connected to the control unit 22 causes the control unit 22 to terminate operation of the second motor 68 and at the same time to connect the first motor 28 to electric power in a reverse sense to that formerly applied to the first motor, to drive it in a reverse direction. Driving of the first motor 28 in reverse direction causes the drive wheels 30 and 44 to turn in opposite directions to the former direction to move the bread carrier 14 and the butter transfer member, respectively, back to their initial position.

As the butter transfer member returns to its initial position, the rearward edge of the transfer member 34 contacts and actuates a fourth microswitch 86 carried by the upper housing 2a and connected with the control unit 22. Thereupon the control unit 22 terminates operation of the first motor 28 and at the same time commences operation of the second motor 68 but in a reverse direction so that the ejector drive wheels 70 cause the ejector plate 73 to be moved transversely to the right back to its initial position. As the ejector plate 73 returns to its initial position, a notched portion 88 of the forward edge moves transversely to the right past a fifth microswitch 90 carried by the previously mentioned brackets 72, and connected to the control unit 22. Thereupon the control unit 22 terminates operation of the second motor 68.

Thus, it will be appreciated at this time the slice of bread 11 has been automatically toasted and buttered while the apparatus as a whole has been recycled to its initial condition ready for operation on a subsequent slice of bread.

The Lower Housing

The previously mentioned lower housing 2b (FIGS. 3 and 4) is a one piece structure formed of stainless steel sheet. Alternatively, the lower housing may be made of other materials and may be produced in various conventional ways such as press forming, fabrication and welding, die-casting or the like.

The lower housing 2b includes left and right, longitudinally and vertically extending, external side walls 100 and 102, respectively, and forward and rear, vertically and transversely extending, external end walls 104 and 106, respectively. The front and side external walls at their upper ends are integral with a flat, horizontal, upper surface 108 of the lower housing 2b. Adjacent the upper ends of the end and side walls is provided an inwardly bent recessed portion 110 extending about the periphery of the lower housing for slidably and snugly receiving the lower edge portions of the upper housing 2a, to locate the upper housing on the lower housing.

To guide the previously mentioned bread carrier 14 and transfer member 34 for longitudinal motion relative to the lower housing, two longitudinally and vertically extending, left and right, internal side walls 114 and 116, respectively, are formed in the lower housing 2b extending downwardly from the upper surface 108. The internal side walls 114 and 116 slidably contact the adjacent, longitudinally extending, left and right side edges of the bread carrier 14 and the transfer member 34 to guide the carrier and the transfer member for longitudinal motion along the lower housing 2b in the manner previously described.

Extending between the internal side walls 114 and 116 at the opposite transverse ends thereof are vertically and transversely extending, forward and rearward, internal end walls 120 and 122, (FIG. 3) respectively, extending downwardly from the upper surface 108.

To provide underlying support for the bread carrier 14, a flat horizontal lower support wall 124 spaced below the surface 108 extends transversely between and is integral with the internal side walls 114 and 116.

In the first position of the bread carrier (FIG. 4), a forward transverse edge of the carrier abuttingly contacts the front internal end wall 120 to locate the carrier in the first position.

To provide a space for receiving the lower toasting unit 26, a rectangular recess 125 (FIG. 3) is formed in the lower support wall 124. The recess 125 is defined by left and right, longitudinally and downwardly extending side walls 130 and 132. The left side wall 130 is spaced transversely intermediate the adjacent left internal side wall 114 and the adjacent longitudinal edge of the previously mentioned rectangular opening 18 in the bread carrier. The internal side wall 132 is similarly positioned on the other side of the unit. Also defining the recess 125 are a forward internal wall 138 integral and coplanar with the forward internal wall 120 and a rearward internal wall 148 spaced forwardly of a forward transverse edge 152 of the opening 18 in the bread carrier 14. The walls 138 and 148 are integral with and extend transversely between the side walls 130 and 132. A horizontal base wall 154 extending between and integral with the walls 138 and 148 and the side walls 130 and 132, is on a level with the bottom edges of the external front and side walls of the housing 2b. With the bread carrier 14 in the initial, forward position, a rearward transverse edge 156 (FIG. 4) of the bread carrier is spaced a short distance forwardly of the end wall 148.

To support the transfer member 34, an upper internal support wall 160 is provided. The upper support wall 160 is horizontally disposed and extends longitudinally between the intermediate and rear, transverse internal walls 32 and 122, respectively, and transversely between the internal side walls 114 and 116. The upper support wall 116 is spaced below the upper surface 108 of the lower housing. Additionally, the upper support wall 160 is spaced a sufficient vertical distance above the lower support wall 124 to insure that when the bread carrier 14 and the transfer member 34 occupy the previously described buttering position, (FIGS. 2 and 3), the lower surface of the transfer member 34 is spaced a short distance vertically above the horizontal upper surface of the slice of bread 11 supported on the bread carrier 14.

Also provided in the lower housing 2b are surfaces for supporting and guiding the previously mentioned ejector plate 73. These surfaces (FIG. 4) include longitudinally spaced, forward and rear, transversely extending, internal guide walls 161 and 162 depending vertically from the upper wall 108 of the lower housing. The internal guide walls 161 and 162 extend transversely perpendicularly to the right from the internal side wall 116. The forward and rear internal guide walls 161 and 162 are spaced short distances forwardly and rearwardly, respectively, of the positions occupied by the forward and rear transverse edges of the slice of bread 11 when supported on the carrier 14 in the second, or buttering, position thereof.

At their right, transverse extremities the internal guide walls 161 and 162 are connected with a longitudinally extending internal wall 163 depending vertically from the upper wall 108.

The ejector plate 73 is supported on an underlying, horizontal support wall 164 extending transversely between the internal side wall 116 and the internal longitudinal wall 163, and longitudinally between the internal guide walls 161 and 162. The upper surface of the support wall 164 is on a horizontal level equal with, or slightly above, the upper horizontal surface of the carrier 14 in the second position thereof. This permits the ejector to move transversely across the upper surface of the carrier 14, in the manner previously described.

The previously mentioned toast inlet and outlet openings 12 and 76 are formed in the lower housing. The inlet opening 12 is defined by two longitudinally spaced inlet walls 165 and 166 extending vertically downwardly from the upper wall 108 and extending transversely between and integral with the left external and internal side walls 100 and 114, respectively. The inlet walls are spaced slightly forwardly and rearwardly of the positions occupied by the forward and rear transverse edges of the slice of bread 11 when on the carrier 14 in the first position thereof. This permits the slice to be inserted easily in the unit. A horizontal inlet bottom wall 167 extends longitudinally between the inlet walls 165 and 166 on a level with the upper surface of the carrier 14.

The toast outlet opening is of similar construction to the first described inlet opening but is located in corresponding alignment with the position occupied by the slice of bread 11 when supported on the carrier 14 in the second, or buttering position thereof.

The Upper Housing

The previously mentioned upper housing 2a includes a generally rectangular, box-like body of stainless steel sheet, including a horizontal rectangular upper wall 180 (FIG. 1). Depending from the upper wall 180, integral therewith, are left and right side walls 182 and 184, respectively, and forward and rearward, end walls 186 and 188, respectively. When the upper housing 2a is seated on the lower housing 2b, the lower edges of the side and end walls of the upper housing fit snugly into the recessed portions 110 on the external walls of the lower housing 26, to locate the upper housing in correct relation on the lower housing.

To secure the upper housing 2a with the lower housing 2b, two releasable clips 189 at opposite ends of the upper housing are hingedly connected thereto for swinging motion in the vertical plane. At their lower ends the clips 189 are provided with resilient deflectable detent portions 190 which engage centrally positioned, rectangular slots 192 in the lower portions of the adjacent external end walls 104 and 106 of the lower housing 2b.

To support and locate the previously mentioned, butter container 38, the upper housing 2a is provided with a vertical opening 193 located, generally, over the area occupied by the foraminous grid 42 when the transfer member 34 is in the initial position thereof. The opening 193 is defined by longitudinally spaced, transversely extending forward and rearward walls 200 and 202 and by transversely spaced, longitudinally extending, left and right internal side walls 204 and 206. The walls 200–206 are integral with and extend perpendicularly downwardly from the horizontal top wall 180 of the upper housing 2a. The lower edges of the walls 200–206 terminate on a level spaced slightly above the upper surface 108 of the lower housing 2b to avoid interference therewith.

The butter container 38 slides smoothly and snugly downwardly into the opening 193 defined by the walls 200–206 until the lower end of the container 38 rests on the upper surface of the transfer member 34 in abutting sliding contact therewith. The container 38 is a double walled, rectangular, container made of stainless steel with the double walls of the container defining an enclosed, liquid tight, water jacket space 208. A water inlet connection 210 and a water outlet connection 212 to the water jacket space 208 are provided at the upper end of the container 38. The interior rectangular dimensions of the butter container 38 are slightly less than that of the underlying foraminous grid 42 (as previously discussed the dimensions of the foraminous grid 42 are generally equal to that of the slice of bread 11 to be buttered). The mass of butter 36 is contained within the interior of the container 38. The butter may be provided by cutting standard commercial blocks of butter to size or by providing special sized rectangular blocks of butter made particularly for the present apparatus.

The mass of butter 36 is maintained in solid condition by circulating water at an appropriate temperature through the water jacket in heat exchanging relation with the butter. The temperature of the water circulated through the jacket should be sufficient to maintain the butter in solid condition so as to avoid problems of the butter becoming rancid. At the same time, the temperature should not be so low as to cause the butter to become so hard as not to enter the openings 43 in the foraminous grid 42.

To ensure that the mass of butter 36 is moved downwardly within the container 38 under sufficient pressure to cause it to enter the openings 43 in the foraminous grid, the previously mentioned weight 40 is provided. The weight 40 is a rectangular stainless steel block dimensioned to fit slidably within the interior of the container 38. The block 40 rests upon the upper surface of the mass of butter 36 and is of sufficient thickness to have enough weight to press the butter downwardly with the desired degree of firmness. Finger receiving openings 214 are provided in the upper surface of weight 40 to enable the latter to be grasped by a hand when this may be desired.

To prevent the butter container from falling downwardly out of the upper housing when the lower housing is removed, projections 215 on the container 38 to engage the upper wall 108 of the upper housing, are provided. However, when the housings 2a and 2b are connected and the container is resting on the upper surface of the transfer member, the projections 215 are spaced above and out of contact with the upper wall 108.

The upper housing 2a also includes a removable, internal support wall 220 positioned internally of the upper housing and extending longitudinally between the forward external wall 186 and the forward internal wall 200 and transversely between the left and right external side walls 182 and 184. The support wall 220 is supported horizontally in spaced relation above the upper surface 108 of the lower housing when the housings are connected, by two longitudinally spaced, sheet metal hanger straps 222 fixedly secured to and extending upwardly from the upper surface of the support wall 220. At their upper ends the hanger straps 222 are releasably secured to the interior surface of the horizontal upper wall 108 of the upper housing 2a by quick release fastenings 224. The fastenings are of the well-known "Dzus" type with a headed male member permanently associated with the upper wall 108 releasably engaging a mating female element carried by the upper portion at the adjacent hanger strap 222.

To provide additional rigidity for the support wall 220, it is provided with integral, upwardly extending, flanges 226 along its longitudinal and transverse edges. The flanges 226 slidably abut the adjacent internal surfaces of the side and end walls of the upper housing to assist in excluding foreign matter from entry into the space above the support wall. Additionally, on assembly, the flanges 226 guide the support wall along the interior of the inner housing so that the male and female elements of the releasable connectors 224 align correctly. The space within the upper housing 2a above the internal support wall 220 constitutes an enclosed, equipment chamber 240 for receiving and enclosing the previously mentioned control unit 22, air compressor 56, air storage container 58, valve 64 and the first and second reversible motors 28 and 68. Each of these units in the equipment chamber 240 is fixedly secured to the upper surface of the support wall 220.

It will be appreciated that housing these various working components within the equipment enclosure 240 keeps them advantageously out of the way of the food contacting portions of the machine, thereby contributing to hygienic operation. In addition, these components are maintained in a relatively dust-free, clean atmosphere, contributing to their long working life.

If, however, it becomes necessary to gain access to these components for servicing at any time, it is merely necessary to release the quick release fasteners 224 so that the support wall 220 may be dropped out of the upper housing 2a carrying these components with it.

Secured to the underside of the internal support wall 220 adjacent the longitudinal mid-point thereof are the two previously mentioned, brackets 31 for supporting the carrier drive wheels 30. Each of the brackets 31 is of generally U-shaped configuration being downwardly open at the lower end of the bracket and having a closed upper end abuttingly contacting and fixedly secured to the underside of the support wall 220. Each bracket 31 is provided with an axle 242 mounted horizontally at the lower end of the bracket extending transversely across the lower open portion thereof. The axles 242 of the two brackets 31 support the two carrier drive wheels 30 for rotation about a horizontal transverse axis. The brackets 31 are spaced transversely apart adjacent the internal side walls 114 and 116 by a sufficient distance to permit the slice of bread 11 to pass between the brackets 31 without interference as the carrier 14 moves from the initial to the second position. The brackets 45 for supporting the transfer drive wheels 44 and the brackets 72 for supporting the ejector drive wheels 70 are also secured to the underside of the internal support plate 220 and are of generally similar construction to the brackets 31.

Secured to each axle 242 transversely outwardly of the associated bracket 31 is a drive sprocket 244 (FIG. 4) engaged by one of two drive chains 246. The two drive chains 246 pass upwardly through suitable openings in the lower support wall 220 to corresponding drive sprockets mounted at opposite ends of a transversely extending, horizontal axle 250. The axle 250 is supported for rotation by transversely spaced brackets 252 fixedly secured to the upper surface of the internal support wall 220. A central drive sprocket 254 is secured to the transverse axle 250. Another drive chain 256 extends between the central drive sprocket and an output drive sprocket 258 on the previously mentioned first motor 28. It will be appreciated that the drive train arrangement described permits rotation of the motor 28 to be transmitted to the carrier drive wheels 30.

A similar drive train arrangement to that just described for the carrier wheels 30, is also provided for the transfer drive wheels 44 supported by the brackets 45. However, a drive chain 260 in the drive train to the transfer drive wheels 44 is relatively crossed over to cause the transfer drive wheels 44 to be driven by the motor 28 concurrently in an opposite rotational sense to the carrier drive wheels 30.

Another drive train arrangement between the ejector drive wheels 70 and the second reversible motor 68 is generally similar to that described for the carrier drive wheels 30, and first motor 28.

Each of the drive wheels 30, 44 and 70 comprises a rubber-tired wheel having a substantially flat periphery. When the upper housing 2a is secured to the lower housing 2b by the clips 189, the rubber tire portions of the wheel peripheries are sufficiently compressed against the adjacent surfaces to be driven to insure positive frictional engagement therewith.

To avoid degradation of these frictional qualities and to improve hygiene, the various drive wheels are so positioned as to avoid frictional contact with the working parts, in areas coming directly into contact with the foodstuffs. Thus, for example, the carrier drive wheels 44 are spaced transversely outside the path of the bread 11 when carried by the carrier 14. Similarly, the brackets 45 are spaced sufficiently transversely apart to locate the transfer drive wheels 44 on the transfer member 34 transversely outside the limits of the foraminous grid 42 which is contacted by butter. No foodstuffs, of course, come into contact with the upper surface of the ejector plate 73.

The Heating Units

The upper heating unit 24 (FIG. 37 includes a rectangular ceramic body 270 supported in horizontal relation, spaced above the position occupied by the upper surface of the slice of bread 11 when located on the carrier 14, by longitudinally spaced metal carrier straps 272. The carrier straps 272 are secured to and extend between the upper surface of the ceramic body 270 and the lower surface of the previously mentioned internal support wall 220. Positioned within a downwardly facing recessed portion 274 of the ceramic body 270 are a plurality of longitudinally extending, transversely spaced, electric resistance heating elements 276 which are connected electrically to the previously mentioned control unit 22.

The lower heating unit 26 includes another generally rectangular ceramic body 280 supported on integral ceramic legs 282 at the corners of the body 280 so that the upper surface of the body 280 is spaced below and adjacent the lower surface of the carrier 14 in the first position thereof. The body 280 and legs 282 fit removably within the previously mentioned recess 125 for the lower heating unit provided in the lower housing 2b, with the legs 282 loosely contacting the corners of the recess. A plurality of vertically extending, parallel channels 284 extend through the ceramic body 280 to permit toast crumbs and the like to fall through the body 280 to the bottom of the recess. Intermediate the channels 34, the upper body 280 includes a plurality of parallel, transversely spaced, webs 286, each of which is grooved on its upper surface to receive a longitudinally and horizontally extending electrical resistance heating element 288. The heating elements 288 are spaced uniformly beneath the opening 18 in the carrier so that heat passes upwardly from the heating elements 288 to toast the lower surface of the slice of bread through the opening 18.

The ceramic bodies 270 and 280 localize the heat on the bread and protect the remainder of the unit from becoming too hot.

Electricity for the heating elements 288 of the lower unit 26 is delivered to a female plug connection 290 mounted in the upper surface of the ceramic body 280 adjacent the forward end thereof, transversely generally centrally of the lower unit 26. A male plug 292 separably and matingly engaged with the female plug connection 290, is carried by a depending U-shaped bracket 294 fixedly secured to the lower surface of the previously mentioned internal support wall 220 of the upper housing 2a. The male plug 292 is connected with the previously mentioned control unit 222. The bracket 294 passes through a rectangular recessed opening 296 provided in the carrier 14 adjacent the forward end thereof.

It will be appreciated that as the upper housing 2a is assembled onto the lower housing 2b, the bracket 294 carries the male plug 292 into mating engagement with the female plug 290 connected to the lower heating element so that the latter is electrically connected with the control unit 22.

The Air Distribution System

The previously mentioned air distribution unit 48 includes the five longitudinally extending transversely spaced nozzle tubes 50 (FIG. 2) positioned above the position occupied by the foraminous grid 42 in the second or forward position of the transfer member 34.

Spaced along the lower surface of each nozzle tube are a plurality of generally conical openings or nozzles 51 diverging in a downward direction. The ends of the nozzle tubes 50 and of the previously mentioned manifold tube 54 are closed by threaded plugs 302 which may be removed to permit a wire brush to be passed through the tube for servicing purposes if this should become necessary. Air delivered to the nozzle tubes 50 exits downwardly therefrom through the various nozzle openings 51. The tubes 50 are spaced a sufficient distance above the upper housing for the conical jets of air issuing from the adjacent openings 51 to overlap so that substantially the entire upper surface of the foraminous grid 42 is subjected to a downwardly directed high pressure blast of air. The pressure applied to the tubes 50 is sufficiently in excess of atmospheric pressure to cause the butter within the openings 43 to be blown outwardly and downwardly from the openings into contact with the upper surface of the slice of bread 11. The clearing action of the air blast may be assisted, if necessary, by associating a heating unit with the air distribution 48 to cause heated air to be directed downwardly through the openings 43.

Air is delivered to the nozzle tubes 50 through the manifold 54 which extends transversely and generally centrally across and above the nozzle tubes 50 and is fixedly connected therewith in fluid communication by vertical connecting tubes 306. At the transverse center point of the manifold 54 is an upwardly extending, externally threaded, hollow pipe 308 which passes vertically through an adjacent opening in the internal support wall 220 of the upper housing. A nut 310 threadedly engages the pipe 308 and is tightened against the upper surface of the support wall 220 to draw the air distribution unit upwardly firmly into contact with two, generally rectangular, spacing members 312 secured to the wall 220 extending downwardly therefrom into abutting contact with the upper side of the nozzle tubes 52.

At its upper end, the connecting tube 308 is in fluid communication with the previously mentioned valve 64, the opening and closing of which is controlled by an electrical actuator 65 connected with the previously mentioned control unit 22. The inlet side of the valve 64 communicates with the outlet of the air storage container 58. The air storage container 58 is adapted to store air under a pressure greater than atmospheric and may, for example, comprise a wire wound, thick walled, glass bottle. However, any suitable conventional air storage container for air under greater than atmospheric pressure may be utilized.

Air under pressure is delivered to the air storage container 58 from the previously mentioned, electrically powered, air compressor 56 which may be of any suitable, small size, commercially available type. A conventional pressure controller sensing the air pressure within the storage container 58 is connected to the air compressor 56 to discontinue the operation thereof when the air pressure in the container 58 reaches a predetermined value and to recommence operation of the air compressor when the pressure in the air storage container is less than the predetermined value. The air compressor draws its air, via an air filter 320, from an opening 324 provided in the forward external end wall of the upper housing 2a.

The Carrier, Transfer and Ejector Members

The carrier 14, as previously mentioned, is a horizontal, rectangular rigid plate, provided with the rectangular opening 18 vertically extending through the plate. The carrier 14 is preferably made of aluminum in view of the rapid heat dissipation of that material, though other non-corroding, low thermal capacity, metals may be used.

When the carrier 14 is in the forward or initial position with its forward transverse edge abutting the internal wall 120 of the lower housing, the opening 18 is positioned vertically above and spaced centrally over the heating elements 288 of the lower heating unit 26. The slice of bread 11 is located centrally over the opening 18 by contact with the previously mentioned locating members 16 which include two transversely spaced end locating members 16a having flared entrance portions, and two limiting locating members 16b positioned adjacent the right transverse edge of the carrier 14. As the slice of bread 11 is slid inwardly through the toast inlet opening 12, it contacts one or other of the transversely spaced end locating members 16a to be centered longitudinally above the opening 18, supported on the adjacent portions of the carrier. The bread 11 continues to be slid in until it abuts the limiting locating members 16b positioned adjacent the right transverse edge of the carrier. At this time, the slice of bread 11 is properly centered longitudinally and transversely above and overlapping the opening 18.

In addition, the right transverse edge of the slice of bread 11 will have been moved into contact with the previously mentioned first microswitch 20 which is supported by a transverse bracket 330 secured to and extending longitudinally forwardly from the right one of the previously mentioned supporting brackets 31.

The carrier 14 in the initial position extends forwardly of the previously mentioned wall 148 of the toaster recess 125. The carrier drive wheels 30 have their points of driving frictional contact with the upper surface of the carrier 14 spaced forwardly of the wall 148 so that the underlying portions of the support wall 124 hold the carrier 14 firmly against the drive wheels 30.

Upon rotation of the drive wheel 30, the carrier 14 advances, as previously described, until its forward transverse edge comes into abutting contact with the intermediate wall 32. This is arranged to occur slightly before the transfer member 34 reaches the second microswitch 46, so that thereafter slipping rotation occurs for a brief period, between the carrier drive wheels 30 and the carrier 14 in the second position thereof.

The transfer member 34 is a flat, rectangular, rigid, stainless steel plate, which in its initial position has its rear transverse edge abutting the rear transverse internal wall 122 of the lower housing 2b and its forward transverse edge spaced forwardly of the forward portions of the butter container 38. The transfer member 34 in the first position of the transfer member within the area thereof overlapped by the interior of the butter container 38 has fixedly secured thereto the previously mentioned foraminous grid 42.

The foraminous grid 42 has its upper and lower surfaces coplanar with the adjacent upper and lower surfaces of the transfer member 34 and is formed of expanded metal. In the preferred embodiment the expanded metal is configured as disclosed in Simonton U.S. Pat. No. 3,308,597, the relevant portions of which patent are deemed to be incorporated herein by reference. The expanded metal provides sharp edged, linked metal webs defining the previously mentioned openings 43 which extend vertically through the transfer member. As an example, the grid may be formed from stainless steel sheet of 1/64th inch metal thickness with the vertical spacing between the upper and lower surfaces of the grid being 1/16th inch and with the openings 43 having a cross-sectional dimension of approximately ⅛th of an inch by ⅛th of an inch. It will be realized, however, that these figures are merely exemplary and that different values may be chosen. Moreover, different configurations of the foraminous grid 42 may be utilized if so desired.

The solid butter particles blown out of the grid onto the upper surface of the toast will frequently be melted upon contact with the upper surface of the toast which is still very hot having only just come from the toaster. Thus, the butter will sink into the toast in the manner appreciated by customers.

In the first position of the transfer member 42 while it is stationary, the weight 40 urges the mass of butter 36 downwardly under sufficient pressure to cause butter to enter many of the openings 43 and at least partially fill the openings. Upon rotation of the transfer drive wheels 44, the sharp edges of the metal grid 42 gouge into the butter to increase the penetration of solid butter into the openings 43. As motion continues, the butter within the openings 43 becomes completely severed from the main mass of butter within the reservoir 36.

During the returning motion of the transfer member to the initial position, the grid 42 traveling inwardly into the butter container also scrapes butter into the openings by the gouging action previously described to assist in preloading the foraminous grid ready for the next succeeding buttering operation.

It will be appreciated that the degree to which the butter penetrates the openings 43 in the transfer member depends upon the relative hardness of the butter which in turn depends upon the temperature of the butter as controlled by the temperature of the water passing through the water jacket. By selective variation of the temperature of the water passing through the water jacket, it is therefore possible to vary the amount of butter delivered to each slice of toast during each buttering operation. However, care should be taken that in raising the temperature of the water to soften the butter to increase the amount of butter delivered, the temperature is not raised to a level at which the butter is likely to become rancid within the space of less than a day.

As the forward motion of the transfer member to the second position continues, the foraminous grid 42 moves forwardly out of the area overlapped by the butter container 38 to move towards and above the slice of bread 11. During this motion, the weight of the water-filled, double-jacketed, butter container 38 pressing down on the upper surface of the transfer member is sufficient to prevent butter not within the openings 43 from being carried outwardly beneath the lower forward transverse edge of the butter container 38 and the adjacent upper surface of the transfer member 34.

As the foraminous grid 42 moves forwardly, so the rear portion of the transfer member which is not foraminous, moves into the area overlapped by the butter container to block downward advance of the butter under the influence of the weight 40. This insures that subsequent return of the transfer member 34 is not blocked by downward motion of the butter occuring while the foraminous member 42 is moved to the second position.

The transfer drive wheels 44 contact the forward upper surface of the transfer member 34 in an area positioned longitudinally between the intermediate internal wall 32 and the forward end of the butter container 38 so that the underlying portions of the upper support wall 160 support the transfer member 34 firmly against the transfer drive wheels 44. The transfer drive wheels 44 are spaced transversely apart out of the path of the foraminous grid 42 so that butter does not come into contact with the drive wheels 44.

To provide support for the forward end of the transfer member 34 to support it horizontally while air is being blown through it by the distribution unit 48, the transfer member is provided with forward, transversely spaced shoulders 332 (FIG. 4) spaced rearwardly of the forward edge of the transfer member. The shoulders 332 in the second position of the transfer member move onto and are supported by underlying support portions 334 (FIG. 3) formed integrally on and projecting forwardly of the previously mentioned support brackets 31 for the carrier drive wheels 30. Each of the support portions 334 includes a horizontal, forwardly extending edge 336 which underlies and supports the transfer member adjacent the shoulder 332 in the second position. The support portion 334 also includes a downwardly and rearwardly inclined guiding portion 338 which is impinged upon by the advancing shoulder 332 to guide the shoulder upwardly onto the edge 336. The left one of the shoulders 332 contacts the previously mentioned second microswitch 46 which is secured to and carried by the left one of the support brackets 31, to actuate the second microswitch.

In its second position, the rear transverse edge of the transfer member is spaced rearwardly of the butter container 38. As the transfer member 34 moves back to its initial position during the operations previously described, the rear transverse edge of the transfer member moves into contact with the fourth microswitch 86 which is supported by a bracket 340 secured to the interior of the rear end wall of the upper housing 2a, to actuate the fourth microswitch.

It will be realized that the construction described for the transfer member and foraminous grid offers a unique advantage in that it provides a buttering machine which may operate utilizing butter in the solid condition. This very significantly avoids problems associated with prior machines which require the butter to be melted and thereby avoids problems of the butter becoming rancid during a normal days operation of the machine. Furthermore, although the invention has thus far been disclosed only with reference to butter, it will be understood that by the term butter I include not only dairy butter but also margarine and any other materials commonly applied to the surface of bread in a spreadable condition.

The toast ejector 73 comprises a generally rectangular stainless steel metal plate supported by the wall 164 with its lower surface generally on a level with the upper surface of the carrier and which in its initial position has its forward longitudinal edge 74 spaced out of the path of the slice of bread 11 on the carrier 14.

Rotation of the ejector drive wheels 70 during ejecting operation, advances the plate transversely to the left into contact with the slice of bread to move it off the carrier 14 and outwardly of the toast outlet opening. Motion continues until the rear edge 78 of the ejector plate 73 moves transversely to the left beyond the third microswitch 80 at which time about ¼ of the slice of bread is exposed outwardly of the toast outlet opening. The microswitch 80 is supported by connecting structure to the forward one of the brackets 72 for supporting the ejector drive wheel 70, and is of the type actuated on release of the microswitch feeler.

On return of the ejector plate 73 to its initial position, the previously mentioned recessed portion 88 in the forward edge 74 passes transversely to the right of the fifth microswitch 90 which is of the type actuated upon release of the microswitch feeler. The microswitch 90 is supported by connecting structure to the right bracket 72. It is necessary to recess the portion 88 to the right of the edge 74 in order to position the microswitch 90 out of the path of the slice of bread 11 on the carrier 14.

The various microswitches utilized in the machine are all standard, commercially available microswitches. Furthermore, the particular details of the control unit 22 utilized to coordinate the operations of the machine in response to the information provided by the microswitches forms no part of the present invention as it is considered to be within the competence of a skilled electrical technician to devise an electrical circuit to perform the sequence of operations initially described in response to the microswitch signals.

Although the invention is described with reference to an embodiment adapted to provide one slice of toast at a time, it will be understood that it may be readily modified to provide multiple slices of buttered toast in each operation.

Hygiene

Cleaning of the apparatus at the end of a days working operations is particularly simple with the construction described. The parts of the apparatus which come into direct contact with foodstuffs are the bread carrier 14, the transfer member 34, the ejector 73, the butter container 38 and weight 40 and the lower housing 2b.

First the weight 40 is lifted off and placed in suitable cleaning liquid such as boiling or soapy water. Then the butter container 38 is slid upwardly and outwardly entirely out of the upper housing 2a, and is placed in the cleaning liquid.

Then by releasing the clips 189, the lower housing 2b may be readily separated from the upper housing 2a and removed. The lower heating unit 26 is lifted out of the housing 2b. This heating unit will not, of course, require direct washing as its normal high operating temperatures will maintain the lower heating unit in a sterile condition.

The carrier, transfer and ejector members are all lifted out of the unitary lower housing 2b on which they rest and all these four parts are totally immersed in the cleaning liquid for complete cleaning of the food contacting portions of the apparatus. The housing 2b and the carrier, transfer and ejector members may be separately dried.

Reassembly of the members with the lower housing is particularly simple. First, the lower heating unit 26 is put back into the recess 125 in the lower housing. Next, the carrier 14 is put back in its first position resting on top of the support wall 124. Then ejector plate 73 is put back in its first position on top of the support wall 164 and the transfer member 34 is put back in its first position on top of the upper support wall 160. The lower housing is then reconnected with the upper housing 2a by use of the clips 188. Finally, the cleaned butter container 38 is slid back into the upper housing 2a ready for subsequent refilling with a fresh supply of butter.

It will be appreciated that with this construction assembly and disassembly of the unit is particularly simple as all the parts to be cleaned merely rest upon each other and may readily be separated. Furthermore, all of the parts of the unit directly coming into contact with foodstuff are adapted for complete immersion in cleaning liquids such as boiling water commonly used in catering operations. Thus, the unit is particularly adapt to maintain a high degree of hygiene.

SUMMARY OF ADVANTAGES

It will be appreciated that in following the method and apparatus of the present invention for providing buttered toast, particular advantages are provided.

Most importantly, the present invention provides a buttering system which operates utilizing unmelted, solid butter. By the use of the foraminous transfer member it becomes possible to apply butter from a solid mass to the bread to be buttered without requiring the mass to be melted. This entirely obviates problems of rancidity encountered in certain earlier systems which required the main mass of butter to be kept in a melted condition.

Also very significant is the hygienic construction of the unit which permits all the working parts coming into direct contact with foodstuffs to be easily disassembled and reassembled to enable the food contacting portions of the apparatus to be thoroughly cleaned at the conclusion of each days operations. In this connection, the unitary lower housing and the simple underlying supporting and guiding structure provided by the housing for the moving members, namely the transfer, carrier and ejector members, is particularly noteworthy.

I claim:

1. An apparatus for applying butter from a mass thereof in solid condition to a surface of a slice of bread, the apparatus comprising,
   a housing,
   a transfer member,
   connecting means connecting said transfer member with said housing,
   a plurality of openings extending through said transfer member,
   first means connected with said housing for moving the mass of butter into contact with said transfer member to cause a portion of the butter to enter said openings,
   second means connected with said housing for causing relative separation between the mass of butter and said transfer member to sever the butter within the openings from the mass of butter to leave said openings at least partially filled with butter after separation,
   support means connected with said housing for supporting the slice of bread with said openings in said transfer member positioned adjacent and facing toward a surface of the slice of bread; and
   fluid pressure means connected with said housing for directing gas under pressure through said openings in said transfer member to propel the butter within said openings outwardly therefrom into contact with the slice of bread.

2. An apparatus as defined in claim 1 further comprising,
   third means connected with a said support means for movement of the support means between first and second positions thereof, said support means occupying said first position prior to movement to said second position, said support means in said second position supporting the slice of bread with said openings in said transfer member positioned adjacent and facing toward a surface of the slice of bread; and
   heating means connected with said housing for applying sufficient heat to the slice of bread when said support means occupies said first position to toast the bread.

3. An apparatus as defined in claim 1 further comprising heat exchange means connected with said housing for contacting the mass of butter to maintain the mass of butter in solid condition within a temperature range having an upper limit sufficiently low to avoid rancidity and a lower limit sufficiently high to prevent the butter from becoming too hard to enter said openings of the transfer member under the influence of said first means.

4. An apparatus as defined in claim 1 further comprising, ejector means connected with said housing for contacting the slice of bread subsequent to application of butter thereto to move the slice of bread outwardly of said housing.

5. An apparatus as defined in claim 1 further comprising,
   third means connected with said housing for contacting said transfer member on an opposite side of said transfer member when said transfer member is in contact with the mass of butter to prevent butter being moved entirely through said openings.

6. An apparatus as defined in claim 1 wherein, said connecting means connects said transfer member with said housing for motion relative to said housing, and wherein said transfer member further includes, spaced, opposed, first and second surfaces, said openings extending between said first and second surfaces; and wherein said first means further includes, guide means connected with said housing for guiding the mass of butter into contact with at least a portion of one of said surfaces of said transfer member in an initial position of said transfer member in a first direction axially of the adjacent openings in said portion of said transfer member, said guiding means further for preventing motion of the mass of butter in directions perpendicular to said first direction, biasing means connected with said guide means for urging the mass of butter in said first direction to cause a portion of the butter to enter said openings in said portion of said transfer member;

and wherein said second means further includes, moving means connected with said housing and with said transfer member for moving said transfer member relative to said housing, said moving means causing said openings in said portion of said transfer member to move initially in a direction generally perpendicular to said first direction to shear the butter within said openings in said portion of said transfer member from the mass of butter to leave said openings at least partially filled with butter, said moving means moving said portion of said transfer member to a second position spaced out of contact with the mass of butter;

and wherein said support means includes, a carrier for contacting the slice of bread to support the slice with the surface to be buttered spaced from said portion of said transfer member in said second position thereof with said openings in said portion of said transfer member facing toward a surface of the slice of bread.

7. An apparatus as defined in claim 6 wherein, said fluid pressure means further includes, a source of air under greater than atmospheric pressure, tube means connected with said housing, valve means connected with said source and with said tube means for selectively placing said tube means in fluid communication with said source of air under pressure; and a plurality of nozzle means for directing air outwardly of said tube means, said nozzle means supported by said tube means facing toward said transfer member on an opposite side thereof from said support means, said nozzle means for directing air under pressure through said openings in the transfer member to propel the butter outwardly therefrom into contact with a surface of the slide of bread.

8. An apparatus as defined in claim 6 further comprising, blocking means connected with said transfer member for concurrent motion therewith, said blocking means during motion of said portion of said transfer member from said initial to said second position thereof moving concurrently into the position formerly occupied by said portion of said transfer member to prevent movement of the mass of butter in said first direction to insure that subsequent return of said portion of said transfer member to the initial position thereof is not blocked by the mass of butter.

9. An apparatus for applying butter from a mass thereof in solid form to one surface of a slice of bread, the apparatus comprising, a housing, a transfer member including, first and second, opposed flat surfaces disposed in parallel relation to a first plane, a plurality of openings through said member extending perpendicularly between said first and second surfaces;

transfer guide means connected with said housing supporting said transfer member for motion parallel to said first plane within said housing, butter guide means connected with said housing for receiving the mass of butter and for guiding the mass of butter in a first direction perpendicularly to said first plane into contact with said first surface of said transfer member in an initial position thereof, said guide means further preventing motion of the mass of butter in directions perpendicular to said first direction, biasing means connected with said housing for contacting the mass of butter to urge the butter in said first direction to cause at least a portion of the butter to enter said openings in said transfer member, moving means connected with said transfer member and with said housing for moving said transfer member in a second direction perpendicular to said first direction to cause said transfer member to shear the butter within said openings from the mass of butter to leave said openings at least partially filled with butter, said moving means moving said transfer member to a second position thereof within said housing, support means connected with said housing, said support means supporting the slice of bread with a surface thereof disposed in parallel relation to said first plane in spaced opposed relation to said transfer member in said second position thereof, said openings facing toward the surface of the slice of bread; and fluid pressure means connected with said housing for directing gas under pressure through said openings to propel the butter within said openings outwardly therefrom into contact with the surface of the slice of bread.

* * * * *